May 19, 1953     A. F. CHIUZZI     2,639,367
MANUALLY ROTATABLE AND TILTABLE HEADLAMP
Filed Feb. 15, 1950
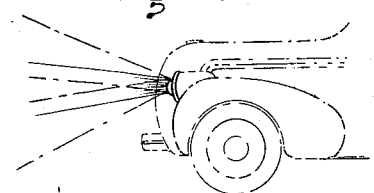
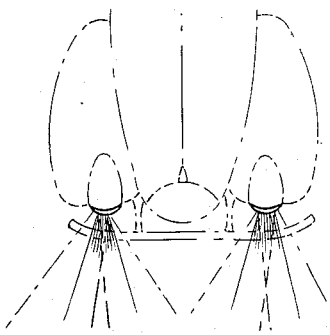
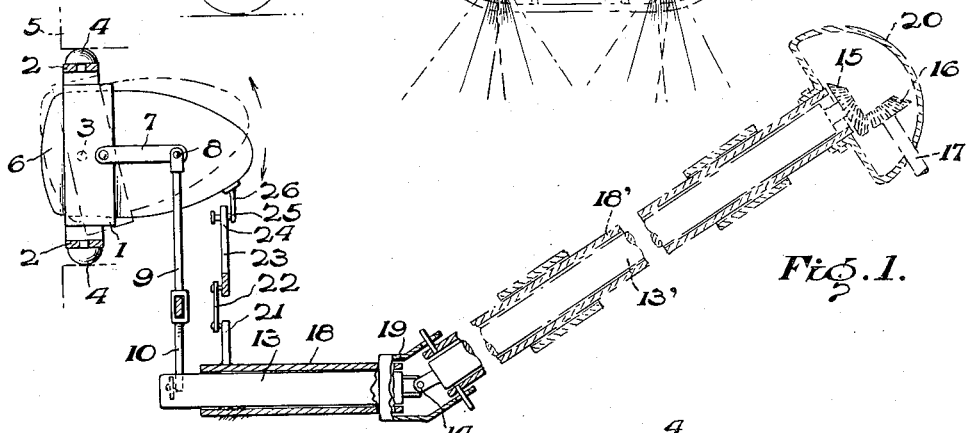
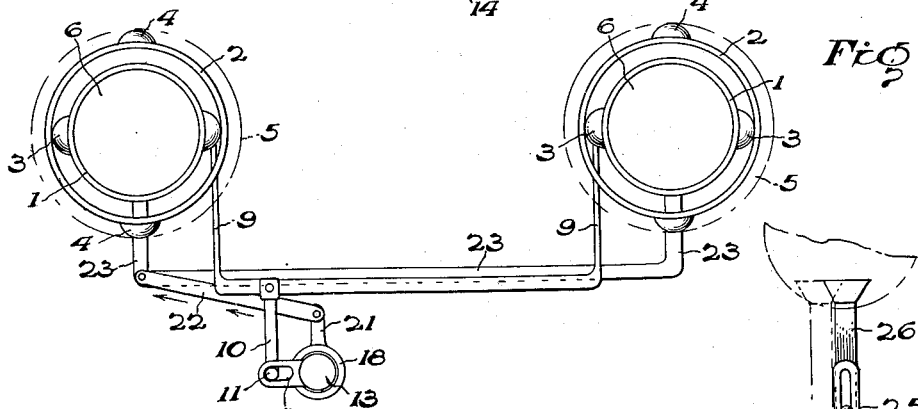
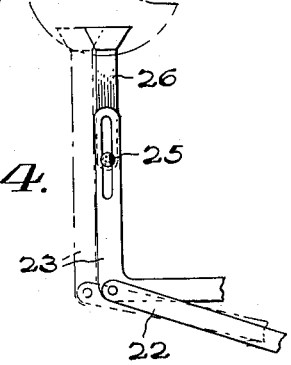
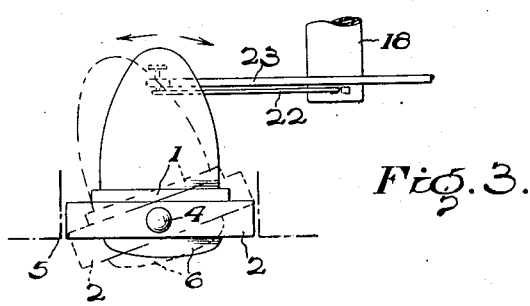
INVENTOR
Angel F. Chiuzzi.
BY
ATTORNEY Patented May 19, 1953

2,639,367

UNITED STATES PATENT OFFICE 2,639,367

MANUALLY ROTATABLE AND TILTABLE HEADLAMP

Angel Felipe Chiuzzi, Saavedra, Argentina

Application February 15, 1950, Serial No. 144,211
In Argentina April 4, 1949

1 Claim. (Cl. 240—61.6)

The present invention refers to pivoting devices for vehicle searchlights, its main object being to provide a combined-rotation support particularly adaptable to searchlights of the kind usually fitted on automobile vehicles.

The present device is the outcome of considerable practical experience. In fact, it is well known that accidents are often caused by the glare of automobile headlamps and with this circumstance in view it was endeavoured to develop a system which, while readily adaptable to the usual headlights of road vehicles, would be low in cost and offer maximum advantages in neutralizing the present dangerous road and highway lighting system.

Road vehicles are usually equipped with a pair of fixed headlights. These headlights are double-acting, i. e., they have a high and a low beam, the latter being particularly arranged to avoid the blinding effect which is inevitably caused by the high light and affects oncoming drivers.

Modern headlamps as applied to present-day cars, i. e., of the sealed-beam type, have a low beam which is practically as strong as, or stronger than, the high beam of the usual lamps. The blinding glare would thus seem to be altogether unavoidable.

The device according to the present invention offers a very advantageous solution to this difficulty, regardless of the type of headlamp employed. It consists, principally, in mounting the car's headlights in a pair of ring-shaped supports. These supports turn independently of one another, each being connected with hand-controlled means. The headlamps can thus be turned laterally or vertically at any moment, shifting the beams of light in different angular directions.

The invention likewise envisages other accessory objects that will be made clear during the course of the present description.

In order that the present invention may be more clearly understood and readily put into practice, same will now be explained with particular reference to attached drawings illustrating, as an example, a preferred embodiment thereof.

In the drawings:

Figure 1 is a diagrammatic view of the pivoting device, to which a headlamp of the usual kind has been adapted.

Figure 2 is another diagrammatic view showing the device adapted to other kinds of headlamps.

Figure 3 is a part detail of the side-action control for the headlamps.

Figure 4 is a further diagrammatic detail of the connecting parts of said side-action control and, finally, Figures 5 and 6 illustrate the angular position of the direction of the rays of light.

Like numerals represent like or similar parts throughout the several figures of the drawings.

According to a preferred embodiment of the invention, the device of the present application comprises a supporting system for the main headlights of a vehicle. These supports consist of a pair of rings 1 and 2, the first contained within the second and both, normally, concentrically arranged (see Figure 2).

Supporting inner ring 1 is in turn rotatably mounted within outer ring 2 surrounding it. This arrangement is accomplished by means of a pair of shaft pins 3 horizontally set at opposite positions and permitting horizontal rotation of the ring. Such pins may be replaced by balls or similarly-acting hemispheres. Ring 2 is in turn provided with a further pair of ball or pin shafts 4, arranged in a vertical position and pivotally set with case or cavity 5 housing each of the headlamps 6. Said headlamps are in turn fixedly adapted to the inside of the smaller ring 1.

From the foregoing it will be seen that the headlights in question are subject to motion independently transmitted to any of supporting rings 1 and 2. That is to say, by changing the position of the first ring 1 turning on ball or pin shafts 3, the headlamps will be shifted vertically, as shown in Figures 1 and 5. On the other hand, if the outer ring 2 is acted upon to turn on ball or pin shafts 4, the displacement of the headlamps will be sideways, as illustrated by Figures 3 and 6.

The means provided for such movements comprise the following parts: a strip 7 fixed by one of its ends to each of rings 1 (Figures 1 and 2), its free end being adapted, through pivot 8, to the free ends of a U-shaped bar 9, the web of which is provided with an extension arm 10. This extension, in turn, is equipped with a pin 11 centrally housed within slot 12 forming integral part of the end of a rotatable shaft 13.

This stem is rotatably connected to a similar part 13' of a larger size, the connection being effected by means of a universal joint or similar arrangement 14. The free end of the larger stem 13' possesses a toothed pinion 15 meshing at right angles with a similar pinion forming integral part of an operating handle 17.

As can be seen from Figure 1, both stems 13 and 13' are operatively housed within a couple of sleeves 18 and 18' which cover them almost entirely and allow them to turn freely. These sleeves are duly connected to one another by means of a coupling 19. This coupling must likewise permit free semi-rotatory action of both sleeves when handle 17 is shifted to one side or another. This motion is made feasible by housing 20 forming integral part of the end of sleeve 18' and covering the transmission.

The free end of sleeve 18 is rigidly provided with a flat lever 21 to which is pivoted a link 22 joining said lever with a U-shaped bracket 23 joined through a slot 24 to pin 25 of a post 26 fixed to the housing or body of one of the headlamps.

Bracket 23, as likewise similar part 9, is U-shaped, being joined by its remaining flange for the other headlamp of the vehicle.

In order to operate support rings 1 and 2 and, thereby, control the side and horizontal movements of both headlamps, as has been explained, stems 13 or sleeves 18 must be manipulated, according to the kind of movement required. This is accomplished by means of handle 17 placed within easy reach of the driver, on the dashboard of the car or vehicle. The handle is thus made to turn on its axis, operating pinions 15 and 16 and through these, likewise stems 13—13', bringing about horizontal pivotal movement in rings 1 and, respectively, both headlights.

If, on the contrary, a thrust is exerted on said handle 17, sleeves 18—18' are operated together with the mechanism comprised by parts 21 through 26, the axis being at 13—13'. Rings 2 are thus displaced laterally.

As will be seen, both movements are completely independent of one another and can be controlled from the driver's seat with little effort and without hampering the driver's motions.

The invention as herein described and illustrated may be clearly understood and no further explanations will be required by those versed in the matter.

As the invention herein shown and specified has been described in the manner of a preferred embodiment which is to be considered as an illustrative example and in no ways as a limitation upon the invention, same may be subjected to changes in its construction and details, without thereby departing from its essential nature, as clearly defined in the following claim.

I claim:

A dirigible head-lamp structure for vehicles, comprising, in combination, a pair of inner and outer concentric rings, said rings of each pair arranged within the walls of a head-lamp cavity, a head-lamp casing mounted in each inner ring, horizontal pivot members connecting the inner ring of each pair with the outer ring to tilt said casing vertically up and down, vertical pivot members connecting the outer ring of each pair with the walls of said cavity to provide for horizontal swinging of both rings to move the head-lamp casings from side to side, a lever fixed at one end of each inner ring, an elongated U-shaped bar having the ends of its upwardly extending portions pivotally connected with the free end of each of said levers, an arm extending downwardly from the U-shaped bar, a pin offset from the free end of the arm, an oscillatable shaft having a slotted angularly disposed member for receiving said pin, whereby rotary movement of the shaft will move the bar up and down to tilt both inner rings only in a vertical direction; a tubular sleeve surrounding said shaft, a member rigid with said sleeve and projecting radially therefrom, a U-shaped bracket having upwardly extending slotted arms, a link connecting the free end of said member with said bracket, a post rigidly connected to and depending from each headlamp casing and having a laterally offset pin engaging in related slotted arms of the bracket, whereby movement of the bracket by turning of the sleeve will impart sidewise movement to said posts, and means for selectively and manually turning the shaft and the sleeve.

ANGEL FELIPE CHIUZZI.

References Cited in the file of this patent
UNITED STATES PATENTS

| Number | Name | Date |
|---|---|---|
| 1,250,249 | Vaught | Dec. 18, 1917 |
| 1,257,430 | Westhafer | Feb. 26, 1918 |
| 1,398,262 | Gray | Nov. 29, 1921 |
| 1,641,041 | MacPherson | Aug. 30, 1927 |
| 1,699,124 | Sklarek | Jan. 15, 1929 |